(12) United States Patent
Travers et al.

(10) Patent No.: US 8,548,290 B2
(45) Date of Patent: Oct. 1, 2013

(54) DYNAMIC APERTURED WAVEGUIDE FOR NEAR-EYE DISPLAY

(75) Inventors: Paul J. Travers, Honeoye Falls, NY (US); Robert J. Schultz, Farmington, NY (US)

(73) Assignee: Vuzix Corporation, Rochester, NY (US)

( * ) Notice: Subject to any disclaimer, the term of this patent is extended or adjusted under 35 U.S.C. 154(b) by 224 days.

(21) Appl. No.: 13/216,045

(22) Filed: Aug. 23, 2011

(65) Prior Publication Data

US 2013/0051730 A1  Feb. 28, 2013

(51) Int. Cl.
*G02B 6/34* (2006.01)
*G02B 5/18* (2006.01)

(52) U.S. Cl.
USPC .............. 385/37; 385/15; 359/34; 359/569; 359/630

(58) Field of Classification Search
USPC ............ 385/15, 31, 37, 39, 47, 133, 146, 385/147; 359/13, 15, 34, 566, 569, 572, 359/630
See application file for complete search history.

(56) References Cited

U.S. PATENT DOCUMENTS

| | | | |
|---|---|---|---|
| 4,711,512 A | 12/1987 | Upatnieks | |
| 5,224,198 A * | 6/1993 | Jachimowicz et al. | 385/133 |
| 5,323,477 A * | 6/1994 | Lebby et al. | 385/129 |
| 5,973,727 A | 10/1999 | McGrew et al. | |
| 6,181,367 B1 | 1/2001 | McGrew et al. | |
| 6,433,911 B1 | 8/2002 | Chen et al. | |
| 6,580,529 B1 | 6/2003 | Amitai et al. | |
| 6,805,490 B2 | 10/2004 | Levola | |
| 6,985,294 B1 * | 1/2006 | Rosenthal et al. | 359/573 |
| 7,205,960 B2 | 4/2007 | David | |
| 7,206,107 B2 | 4/2007 | Levola | |
| 7,573,640 B2 | 8/2009 | Nivon et al. | |
| 7,728,949 B2 | 6/2010 | Clarke et al. | |

(Continued)

FOREIGN PATENT DOCUMENTS

| | | |
|---|---|---|
| JP | 2009-133998 A | 6/2009 |
| JP | 2011-017969 A | 1/2011 |
| WO | 2010/067116 A1 | 6/2010 |

OTHER PUBLICATIONS

PCT—Notification of Transmittal of the International Search Report and the Written Opinion of the International Searching Authority, or the Declaration; dated Feb. 28, 2013 in corresponding PCT International Application No. PCT/US2012/051716 (2 pages).

(Continued)

*Primary Examiner* — Daniel Petkovsek
(74) *Attorney, Agent, or Firm* — Brian B. Shaw, Esq.; Thomas B. Ryan, Patent Agent; Harter Secrest & Emery LLP

(57) ABSTRACT

A near-eye display of a type having an image generator for generating a succession of angularly related beams and waveguide for propagating the angularly related beams to an eyebox within which a virtual image is visible includes a controllable output aperture for such purposes as reconstructing a better defined pupil within the eyebox while also preserving the possibility for viewing the ambient environment from the eyebox through the controllable output aperture.

16 Claims, 9 Drawing Sheets

(56) References Cited

U.S. PATENT DOCUMENTS

| | | | |
|---|---|---|---|
| 8,160,411 B2* | 4/2012 | Levola et al. | 385/37 |
| 8,320,032 B2* | 11/2012 | Levola | 359/34 |
| 8,376,548 B2* | 2/2013 | Schultz | 353/10 |
| 2006/0066939 A1 | 3/2006 | Kimura | |
| 2007/0188837 A1* | 8/2007 | Shimizu et al. | 359/13 |
| 2008/0117341 A1 | 5/2008 | McGrew | |
| 2008/0239420 A1 | 10/2008 | McGrew | |
| 2010/0277803 A1* | 11/2010 | Pockett et al. | 359/567 |
| 2010/0321781 A1 | 12/2010 | Levola et al. | |

OTHER PUBLICATIONS

PCT—International Search Report dated Feb. 28, 2013 in corresponding PCT International Application No. PCT/US2012/051716 (3 pages).

PCT—Written Opinion of the International Searching Authority dated Feb. 28, 2013 in corresponding PCT International Application No. PCT/US2012/051716 (6 pages).

* cited by examiner

DYNAMIC APERTURED WAVEGUIDE FOR NEAR-EYE DISPLAY

TECHNICAL FIELD

The present invention relates to plate-shaped waveguide systems for transmitting angularly encoded image information particularly for near-eye displays and to controllable output apertures for such purposes as optimizing viewing conditions.

BACKGROUND OF THE INVENTION

Compact near-eye displays often use plate-shaped (usually planar) waveguides for transmitting angular image information to users' eyes as virtual images from image sources located out of the user's line of sight. The image information is generally input near one end of the waveguides and is output near another end of the waveguides. The image information propagates along the waveguides as a plurality of angularly related beams that are internally reflected along the waveguide. Diffractive optics are often used for injecting the image information into the waveguides through a first range of incidence angles that are internally reflected by the waveguides as well as for ejecting the image information through a corresponding range of lower incidence angles for relaying or otherwise forming an exit pupil behind the waveguides in a position that can be aligned with the users' eyes. Often both the waveguides and the diffractive optics at the output end of the waveguides are at least partially transparent so that the user can also view the ambient environment through the waveguides, such as when the image information is not being conveyed by the waveguides or when the image information does not fill the entire field of view.

The waveguide displays are often limited to the use of monochromatic light in which the virtual images are formed in a single color. Conventional diffractive optics tend to diffract different wavelengths through different angles, creating chromatic aberrations. Multiple waveguides (e.g., stacked waveguides) or more complex diffractive optics can be used to mitigate these aberrations but the solutions tend to limit the number of wavelengths or the different angles through which the image information can be effectively transmitted.

The effective exit pupil size within which the virtual images can be seen in a prescribed position behind the waveguides (i.e., within a designed eyebox) is often overly limited because the diffracted light beams tend to spread apart upon leaving the planar waveguides. Variations in the diffraction efficiency of the output diffractive optics with position have been used to expand the exit pupils but these variations complicate the diffractive optics and are especially difficult to achieve with multi-chromatic light.

Some planar optic displays are also intended to support views of the ambient environment within the same eyebox. This requirement places additional burdens on the output diffractive optics to maintain some level of transmissivity.

SUMMARY OF THE INVENTION

The invention in one or more of its preferred embodiments features a controllable aperture for near-eye display waveguides. Electronic controls provide for shifting a transformable grating structure within the aperture between active and passive states as well as through intermediate states of efficiency. For example, the transformable grating structure can be paired with a contiguous mating optic so that together the transformable grating structure and the mating grating structure form a common plate-shaped optic. The transformable grating structure is preferably formed by an electroactive material whose refractive index can be electronically varied from a value that matches the refractive index of the mating grating structure (e.g., the passive state) to one or more other values that do not match the refractive index of the mating grating structure (e.g., the active state).

Within an output aperture, the transformable grating structure and mating grating structure can be appended to the front or back surface of the waveguide thereby operating by transmission or reflection. In the passive state of the transformable grating structure, the output aperture functions largely as an uninterrupted surface of the waveguide, supporting total internal reflection of image-bearing light beams propagating along the waveguide while also supporting largely unobstructed views of the ambient environment through the waveguide. In the active state of the transformable grating structure, the output aperture functions as a diffractive optic embedded in the surface of the waveguide for ejecting the image bearing information from the waveguide into a desired eyebox. To varying degrees, the active state of the transformable grating structure can obscure views of the ambient environment through the waveguide, such as by diffracting transmitted light outside the eyebox. Thus, in the passive state, the output aperture is open for viewing the ambient environment from within the eyebox but is closed to viewing images conveyed along waveguide while in the active state, the output aperture is open for viewing the images conveyed by the waveguide from within the eyebox but can be at least partially closed to viewing the ambient environment.

The electronic controls of the controllable output aperture can be patterned for variously activating different segments of the output aperture, i.e., different sections of the transformable grating structure. That is, the different segments of the output aperture can be made individually addressable so that one or more aperture segments can be switched to an active state while other aperture segments remain in a passive state. The electronic controls can also provide for various intermediate states in which the refractive index difference between the transformable grating structure and its contiguous mating optic can be raised or lowered to regulate diffraction efficiency. Moreover, the electronic controls can be synchronized with the injection of various image-bearing beams such as from a scanning optic so that the beams can be ejected through different portions of the output aperture and for different durations. For example, the higher incident angle beams can be ejected through one segment of the output aperture and the lower incident angle beams can be ejected through a different segment of the output aperture for forming a larger and more uniform pupil within the eyebox using more of the available light. Image uniformity with the eyebox pupil can be further enhanced by regulating diffraction efficiency or the duration of the activation across the multiple segments of the output aperture in synchronism with the ejection of different portions of the images (i.e., the angular constructs of the image).

Similarly controllable transformable grating structures and mating grating structures can be formed on both the inside and outside surfaces of the near-eye display waveguides to separately control the ejection of different portions of the image-bearing information conveyed along the waveguides. For example, two orthogonal dimensions of the eyebox or different ranges of colors can be separately controlled by regulating the timing, diffraction efficiency, or duration of activation within and between the two transformable grating structures.

BRIEF DESCRIPTION OF THE DRAWING FIGURES

DETAILED DESCRIPTION OF THE INVENTION

Figure 1:
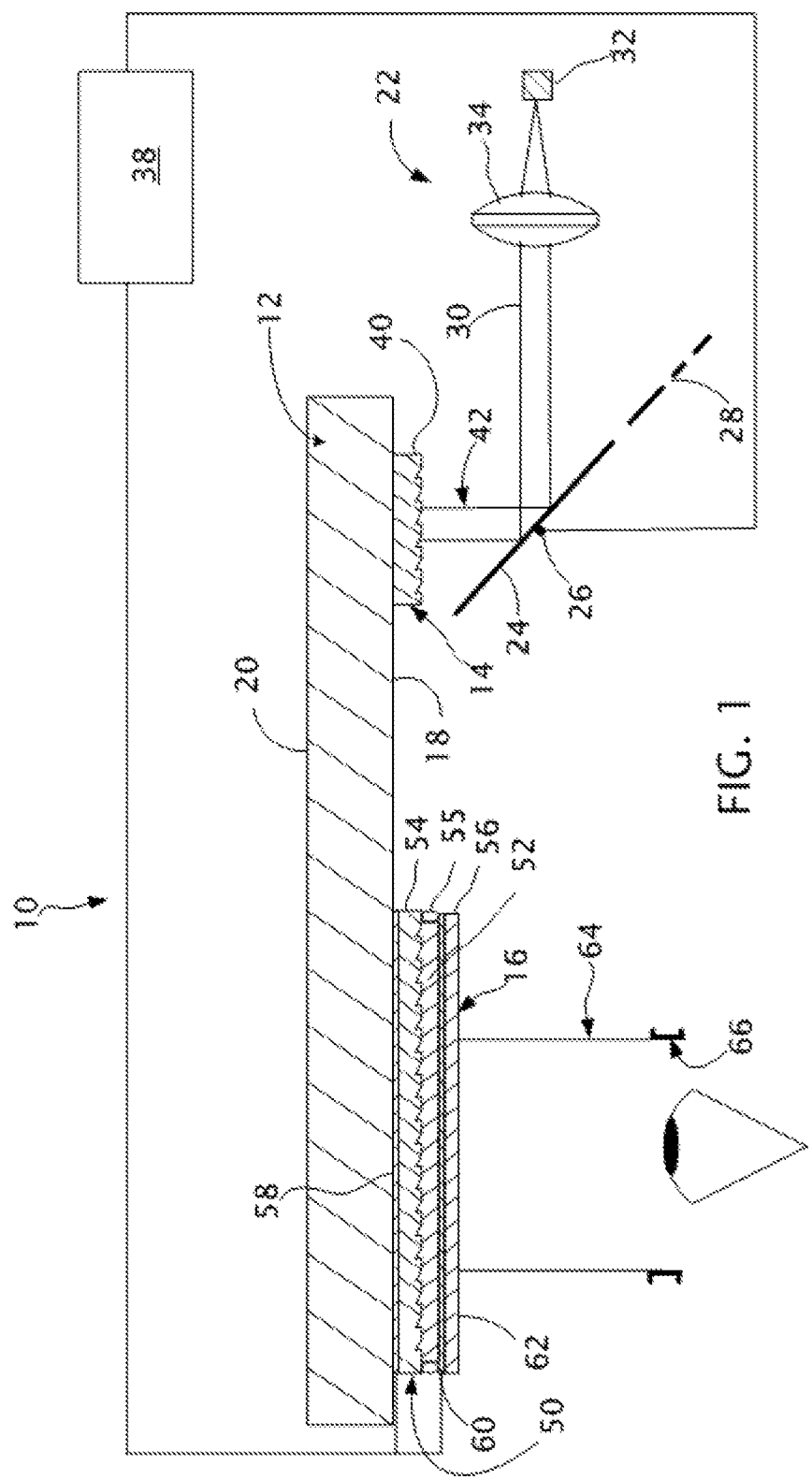
FIG. 1 is a diagrammatic top view of a near-eye display including a plate-shaped waveguide having a controllable output aperture.
Figure 2:
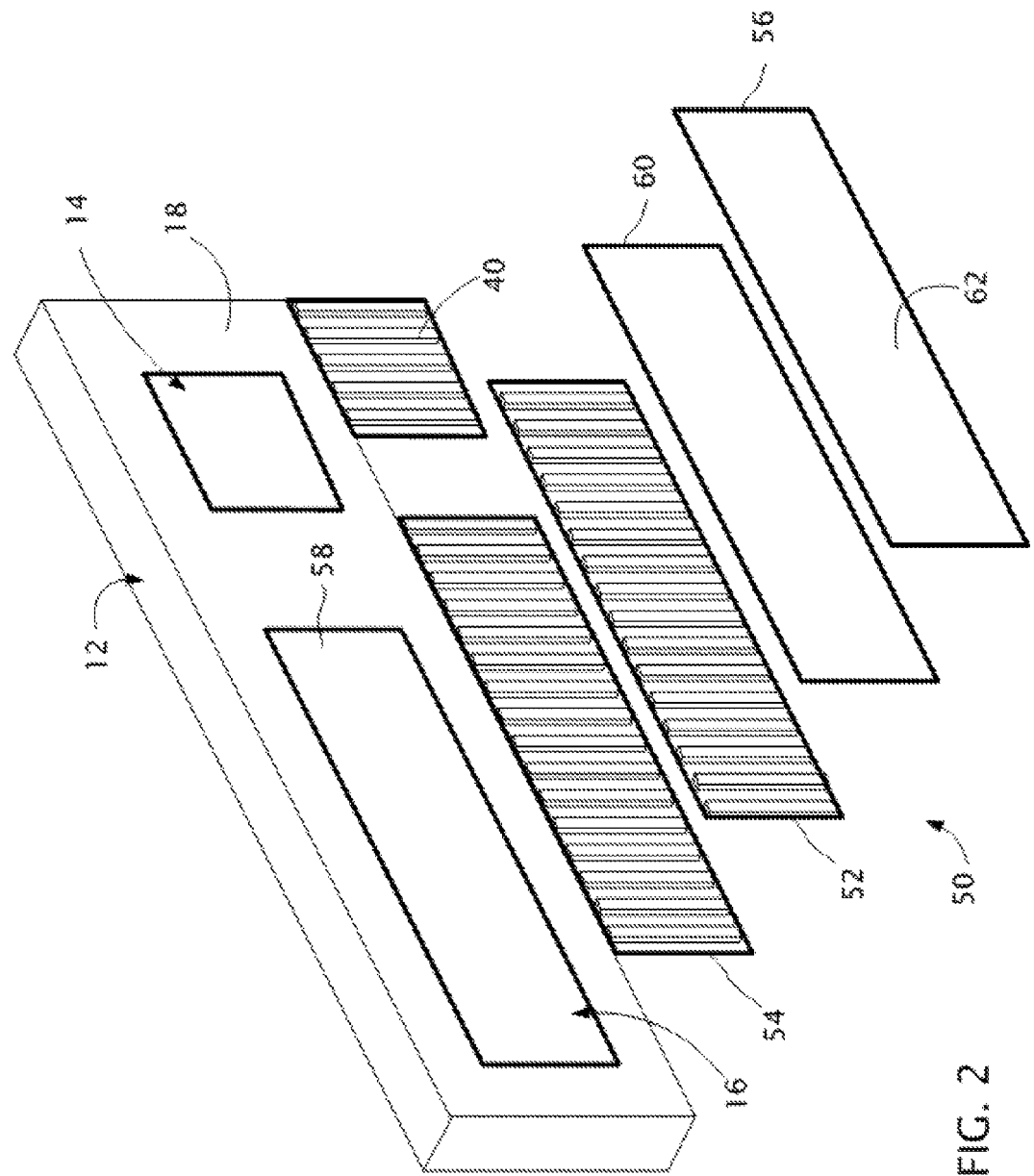
FIG. 2 is an exploded view of the plate-shaped waveguide showing the various layers of the controllable output aperture.

With reference to FIG. 1, a near-eye display 10 of a type including a plate-shaped waveguide 12 also shown in the view of FIG. 2 has an input aperture 14 and a controllable output aperture 16. The plate-shaped waveguide 12 is preferably a transmissive plate having an inside surface 18 (facing the users eye) and an outside surface 20 (facing the ambient environment), with both the inside and outside surfaces 18 and 20 being exposed to air or another lower refractive index medium.

The plate-shaped waveguide 12 can be made of various transmissive optical materials, such as BK7 glass having a nominal refractive index of 1.527, and has dimensions for transmitting light to a position within the field of view of a user from an off axis position at which the light can be injected. For example, the plate-shaped waveguide can have a length of approximately 60 millimeters for reaching the eye position, a height of approximately 30 millimeters allowing for a second dimension of the image, and a thickness of approximately 2 millimeters to support the propagation of light in a desired form while limiting the size and weight of the plate-shaped waveguide 12. Other dimensions, of course, can be used for particular applications for attending to the propagation of light from one position to another along the waveguide. In addition, the plate-shaped waveguide 12 has a planar form, which simplifies propagation issues, but can also be curved to accommodate additional requirements, including aesthetic considerations.

An image generator 22 includes a scanning mirror 24 that is pivotable about two orthogonal axes 26 and 28. The scanning mirror 24 is illuminated by a collimated beam 30 that is formed by a light source 32 together with a collimating optic 34. Poly-chromatic images can be produced by multiple light sources having different nominal wavelengths or by color filtering one or more broad-band light sources. The different angular orientations of the scanning mirror 24 reflect the collimated beam through a range of angles in two dimensions corresponding to different spatial positions within the generated image. A controller 38 synchronizing the output of the light source 32 to the angular position of the scanning mirror 24 individually generates each pixel of the generated image.

Alternatively, the image generator 22 could be formed by a two dimensional array of addressable pixels that forms a real image together with a collimating optic that collimates light from the image generator so that light from each pixel within the image generator is collimated through a unique angle referenced in two dimensions corresponding to its spatial position within the two-dimensional array. A linear array of addressable pixels together with a scanning mirror that is pivotal in one dimension could also be used as an image generator. For example, the light source in 32 shown in FIG. 1 could be replaced by a linear array extending normal to the page with the collimating optic appropriately scaled in this dimension. Light originating from each pixel along the linear array is collimated for forming an instantaneous set of collimated beams through a range of angles corresponding to a first spatial dimension of the generated image along the linear array, and the scanning mirror pivots the set of collimated beams in synchronism with an image driver of the linear array for forming a succession of different sets of collimated beams corresponding to a second spatial dimension of the generated image orthogonal to the linear array. In general, the image generator 22 provides a Fourier transform of a video image intended for viewing through the output aperture as a virtual image.

The input aperture 14 includes a diffractive optic 40 that reorients the range of angularly related beams (only central beam 42 shown) into a corresponding range of angularly related beams (not shown) that are capable of propagating along the plate-shaped waveguide 12. The corresponding range of angularly related beams preferably propagates along the plate-shaped waveguide 12 by total internal reflection from the inside and outside surfaces 18 and 20 of the plate-shaped waveguide 12. With the diffractive optic 40 operating in a transmissive mode, the diffractive optic 40 can be formed in or mated to the inside surface 18 of the plate-shaped waveguide 12. Alternatively, with a diffractive optic operating in a reflective mode, the diffractive optic can be formed in or mated to the outside surface 20 of the plate-shaped waveguide 12.

The diffractive optic 40 can be formed in various ways known to diffractive optics including by etching, stamping, micro-lithography, or holographic techniques. In the illustrated example of FIGS. 1 and 2, the diffractive optic 40 is formed by a stamped epoxy having a nominal refractive index of 1.5 and a pitch of approximately 0.5 microns. The stamped grating has a length of approximately 10 millimeters as a multiple of five times the thickness of the waveguide 12, a width of approximately 20 millimeters to accommodate the other dimension of the image, and a depth of about one micron. Again, the dimensions can be scaled to the particular requirements of other applications.

The controllable output aperture 16 includes a controllable grating 50 formed by a plurality of layers affixed to the inside or outside surfaces 18 or 20 of the plate-shaped waveguide 12. As shown in FIGS. 1 and 2, the controllable grating 50 is affixed to the inside surface 18 of the plate-shaped waveguide 12. The controllable grating 50 includes a transformable grating structure 52 together with a mating (inverse) grating structure 54 such that in a passive state (i.e., deactivated state)

of the transformable grating structure 52, the two grating structures 52 and 54 preferably form an optically homogenous layer.

The transformable grating structure 52 is preferably formed by an electro-active material, such as a liquid crystal material, that fills a space between the mating grating structure 54 and a cover plate 56. A seal 55 confines the electro-active material between the mating grating structure 54 and the cover plate 56. For purposes of the example given, the electro-active material can be a nematic liquid crystal mixture BL037 that is switchable between a refractive index of 1.526 (matching the index of the waveguide) to a refractive index of 1.808. The mating grating structure 54, which provides a mold form for the electro-active material, is preferably formed from a solid optical material similar to conventional gratings, such as by etching or stamping. For example, the illustrated mating grating structure 54 is formed by a stamped epoxy having a nominal refractive index of 1.5 and a pitch of approximately 0.5 microns. The stamped grating has a length of approximately 30 millimeters, a width of approximately 20 millimeters, and a depth of about one micron. Similar to the waveguide 12, the cover plate 56 is preferably formed from a transmissive optical material, such as BK7 glass having a thickness of approximately 0.5 millimeters. Again, the materials can be matched and the dimensions can be scaled to the particular requirements of other applications.

First and second conductive layers 58 and 60, such as may be formed by indium tin oxide (ITO), straddle the transformable grating structure 52 for forming an electrical field across the transformable grating structure 52 for modifying a refractive index of the electro-active material of the transformable grating structure 52 with respect to the mating grating structure 54. As shown, the first conductive layer 58 is formed between the inside surface 18 of the plate-shaped waveguide 12 and the mating diffraction structure 54, and the second conductive layer 60 is formed between the transformable grating structure 52 and cover plate 56. The first and second conductive layers 58 and 60 can be positioned between other layers so long as the appropriate electric field can be formed across the transformable grating structure 52. For example, the first conductive layer 58 could be formed at an interface between the transformable grating structure 52 and the mating grating structure 54. The order of the transformable and mating grating structures 52 and 54 can be reversed. The controller 38 controls the state of the transformable grating structure 52 between active and passive states (including the timing and duration of each state) and can also control the field strength for varying the refractive index of the transformable grating structure 52 within the active state.

Preferably, the refractive indices of the first and second conductive layers 58 and 60, the transformable grating structure 52 in a passive state, the mating grating structure 54, and the cover plate 56 all sufficiently match the refractive index of the plate-shaped waveguide 12 so that in the passive state of the transformable grating structure 52, the controllable output aperture 16 functions similar to the plate-shaped waveguide 12 to support internal reflection of the angularly related beams from the image generator 22 while also supporting the see-through capability to the ambient environment. In other words, the transformable grating structure 52 is preferably essentially invisible in the passive state so that an inside facing surface 62 of the cover plate 56 functions similar to the inside surface 18 of the plate-shaped waveguide 12 as if no substantial interruption of the plate-shaped waveguide 12 has occurred. Conversely, in an active state, the transformable grating structure 52 functions similar to a conventional diffractive optic of a given efficiency for reorienting and ejecting the angularly related image bearing beams from the plate-shaped waveguide into an eyebox 66 for allowing a user to view a virtual image of the image formed by image generator 22. Using the controller 38 to control the timing between the active and passive states of the transformable grating structure 52, the controllable output aperture 16 can support views of the generated image, the ambient environment, or both within the eyebox 66. Although the cover plate 56 is shown sized for covering the controllable grating 50, the cover plate 56 could also be extended along the length of the waveguide 12 and fixed to the waveguide 12 by an index-matching adhesive to maintain a constant effective thickness of the waveguide 12 along a further length of the waveguide 12 such that the inside-facing surface 62 of the cover plate 56 functions as the inside surface 18 of the waveguide 12 for propagating the angularly related beams by total internal reflection.

If the transformable grating structure 52 functions at less than one hundred percent efficiency, light can be ejected from each of the angularly related beams over two or more encounters with the transformable grating structure for widening each beam 64 (only one such beam shown). Preferably, each of the angularly related beams fills the waveguide, i.e., has a sufficient width so that the beam at least nearly overlaps itself with each reflection, so that wider beams can be ejected without substantial gaps. The wider beams assure that the eyebox 66 is filled by each of the different angle beams 64 so that the entire virtual image can be seen throughout the eyebox 66. For constructing a more uniform image within the eyebox, the efficiency of the transformable grating structure 52 or the duration of its activation can be varied between the different angle beams so that the amount of light capable of reaching the eyebox 66 within each beam is more closely balanced. For example the strength of the electric field generated between the first and second conductive layers 58 and 60 can be varied as a function of the instant angular position of the scan mirror 24 (or other angle specific image generator) so that the percent of each beam ejected upon one or more encounters with the transformable grating structure 52 is varied. The relative outputs the different angle beams 64 can be similarly balanced or otherwise regulated by controlling the duration over which the transformable grating structure 52 is activated within the period over which each beam is being propagated along the plate-shaped waveguide 12.

Figure 3:
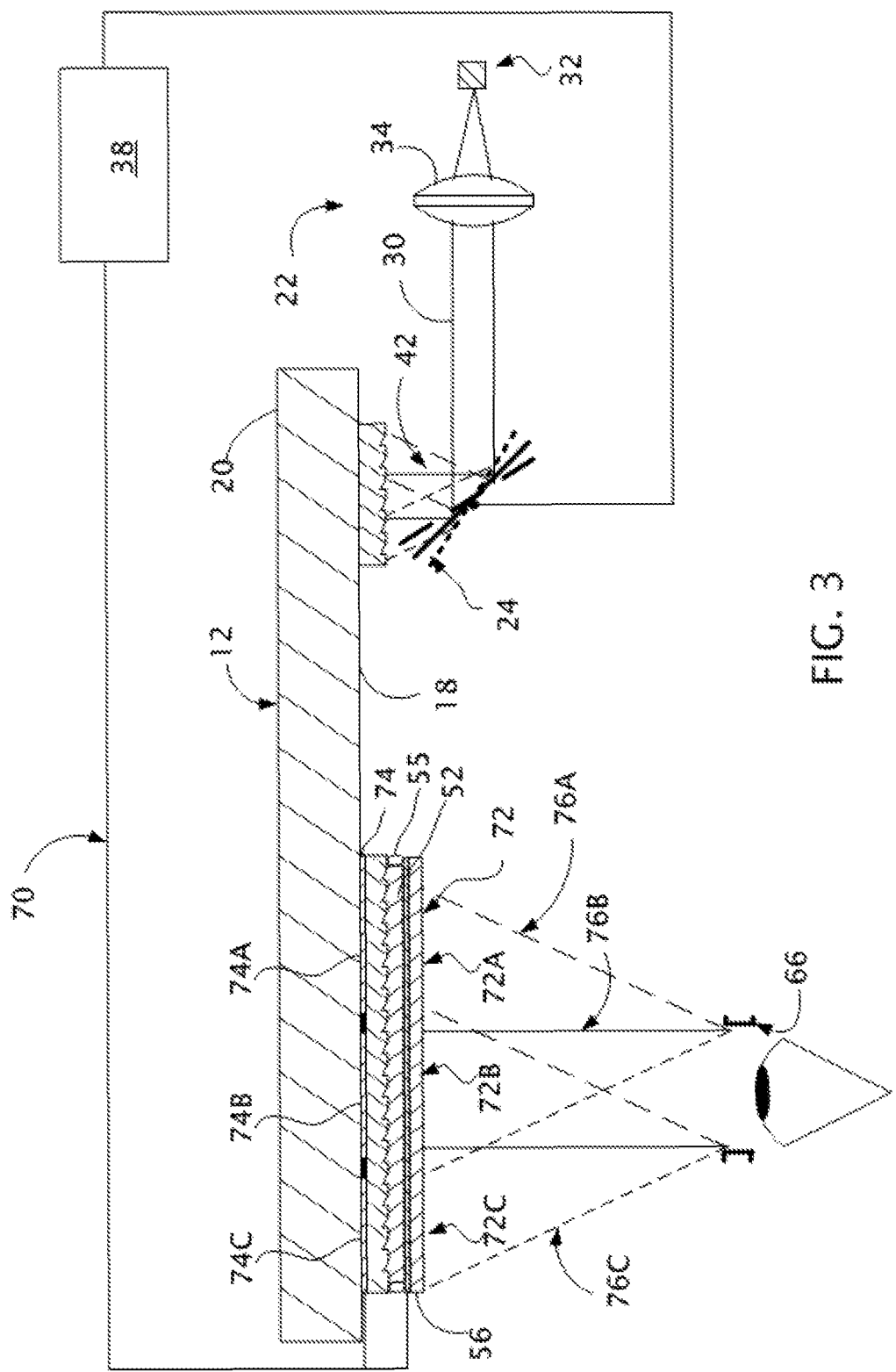
FIG. 3 is a diagrammatic top view near-eye display, similar to the display of FIG. 1 but including a controllable segmented output aperture.

A near-eye display 70 similar to the near-eye display 10 is shown in FIG. 3 modified to include a controllable segmented output aperture 72. Elements of the near-eye display 70 in common with the near-eye display 10 share the same reference numerals. In contrast with the earlier described display 10, the first conductive layer 74 is divided into individually addressable sections 74A, 74B, and 74C each electrically isolated from adjoining addressable sections for individually activating corresponding sections of the transformable grating structure 52. As shown, the addressable sections 74A, 74B, and 74C are located along the plate-shaped waveguide 12 in the direction of the propagation of the angularly related beams. The selective activation of any one or more sections of the transformable grating structure 52 controls the position along the waveguide at which the individual propagating beams can be ejected from the plate-shaped waveguide 12. The activation of the different sections of the transformable grating structure 52 can be synchronized with the input of the different angular beams (e.g., the pivot position of the scanning mirror 24), so that, for example, the largest incidence angle beams corresponding to one side of the generated image can be ejected, for example, as a converging beam 76A through a first segment 72A of the controllable aperture 72 located in advance of the eyebox 66, the lowest incidence angle beams can be ejected, for example, as a converging beam 76C through a third segment 72C of the controllable aperture 72 located just after the eyebox 66, and the median incidence angle beams can be ejected, for example, as converging beam 76B through a second segment 72B of the controllable aperture 72 located in alignment with the eyebox 66. The different ejection points through which the angularly related beams are ejected from the waveguide allow the different angle beams 76A-C to converge toward the same point of overlap within the eyebox 66 for more efficiently reconstructing and enlarging a pupil within the eyebox 66 within which the entire virtual image can be seen.

Although shown with just three different controllable output aperture segments 72A-C, the controllable output aperture 72 can be divided into more individually controllable segments for more finely controlling the location and area through which individual angular beams, e.g., 76A-C, are ejected from the waveguide 12. However, the multiple output aperture segments 72A-C (and any others) are sized and spaced in relation to each other, so that the aperture segments 72A-C provide for independently regulating the passage of light with minimal overall diffractive influence beyond the intended influence of the transformable grating structure 52 for directing light through the aperture segments 72A-C. Each of the angularly related beams preferably fills the waveguide, i.e., has a sufficient width so that the beam at least nearly overlaps itself with each reflection, so that each beam can be ejected from an optimal position along the waveguide 12 for filling the eyebox 66. The field strength within each of the different segments 72A-C of the controllable aperture 72 as well as the timing and duration over which the segments 72A-C are activated can be varied at each different angular position of the scanning mirror 24 (or other angle specific image generator) to reconstruct a pupil within the eyebox 66 having desired properties.

For example, in addition to controlling the position along the waveguide 12 at which each angularly related beam is ejected from the eyebox, the efficiency through which each beam is ejected through one or more output aperture segments 72A-C can also be controlled. Where each beam is ejected through one or more segments 72A-C of the controllable output aperture 72, the distribution of light within different portions of each beam 76A-C can also be controlled. Alternative to or in addition to controlling the diffraction efficiency through which each beam or beam portion is ejected from the waveguide 12, the duration through which each segment 72A-C of the aperture 72 remains in an active state during the propagation of each beam can also be controlled to similarly regulate output distributions and efficiencies. The additional controls over the distribution of light between different angle beams 76A-C as well as the distribution of light within each beam 76A, 76B, or 76C can be controlled for improving image uniformity at different eye positions within the eyebox 66 and for enlarging the area of the eyebox 66 within which the entire virtual image is visible.

Figure 4:
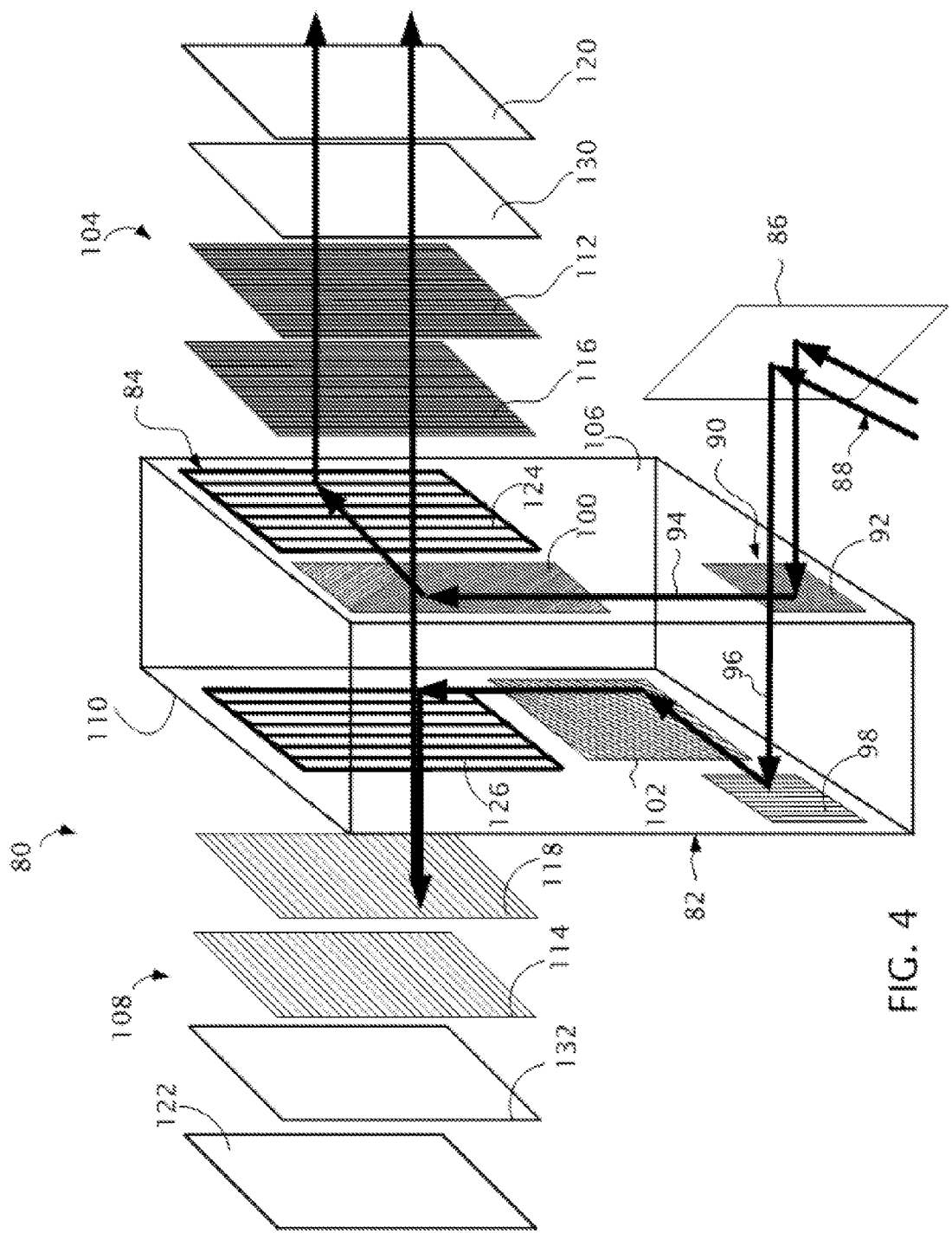
FIG. 4 is an exploded perspective view of an alternative near-eye display including compound input and output structures for separately propagating two different portions of image information conveyed by the waveguide.

Another example of a near-eye display 80 including a plate-shaped waveguide 82 with a controllable output aperture is shown in FIG. 4. Similar to the preceding embodiments, an image generator is formed by a scanning mirror 86 that is illuminated by collimated light 88 and is pivotable about two orthogonal axes. Poly-chromatic images can be produced by multiple light sources having different nominal wavelengths or by color filtering one or more broad-band light sources. The different angular orientations of the scanning mirror 86 reflect the collimated beam 88 through a range of angles in two dimensions corresponding to different spatial positions within the generated image. As described above, other types of image generators can also be used, but preferably at least one dimension of the generated image is composed of different angular beams that are temporally distinguishable (e.g., generated in succession).

An input aperture 90 of the plate-shaped waveguide 82, which receives the collimated angularly related beams, includes a first input diffractive optic 92 that diffracts a first portion 94 (e.g., first spectral portion) of the light conveyed by the collimated beams in a first (e.g., vertical) direction for further propagation along the waveguide 82 by total internal reflection and transmits a second portion 96 (e.g., a second spectral portion) of the light conveyed by the collimated beams to a second input diffractive optic 98. The second portion 96 of the light conveyed by the collimated beams is diffracted by the second input diffractive optic 98 in a second (e.g., horizontal) direction for further propagation along the waveguide 82 by total internal reflection. First and second intermediate diffractive optics 100 and 102 reorient the first and second portions 94 and 96 of the light conveyed by the collimated beams in third (e.g., horizontal) and fourth (e.g., vertical directions) for yet further propagation along the waveguide 82 toward the controllable output aperture 84. Both of the intermediate diffractive optics 100 and 102 can be formed by grating structures having grating rulings that are oriented at acute angles to the propagating beams 94 and 96.

The controllable output aperture 84 includes a first controllable output grating 104 affixed to an inside surface 106 of the plate-shaped waveguide 82 and a second controllable output grating 108 affixed to an outside surface 110 of the plate-shaped waveguide 82. The first controllable output grating 104 provides for diffracting light directly from the waveguide 82 toward an eyebox (not shown). The second controllable output grating 108 provides for diffracting light through both the waveguide 82 and the first controllable output grating 104 toward the same eyebox.

The two controllable output gratings 104 and 108 provide for separately ejecting the different portions 94 and 96 of each of the different angular beams representing different image points. For example, each of the two controllable output gratings 104 and 108 can be optimized for ejecting different spectral portions of each different angular beam. In this regard, the first controllable output grating 104 can be optimized for diffracting one or more shorter wavelengths approaching the red end of the visible spectrum, and the second controllable output grating 108 can be optimized for diffracting one or more longer wavelengths approaching the violet end of the visible spectrum. The two controllable output gratings 104 and 108 can be optimized so that the different wavelength portions of each angular beam are diffracted by similar amounts.

Each of the controllable output gratings 104 and 108 includes a transformable grating structure 112 or 114 together with a mating grating structure 116 or 118 such that in a passive state (i.e., deactivated state) of the transformable grating structure 112 or 114, the two grating structures 112 and 116 or 114 and 116 preferably form an optically homogenous layer. Each of the transformable grating structures 112 and 114 are preferably formed by an electro-active material, such as a liquid crystal material, that fills a space between the mating grating structure 116 or 118 and a cover plate 120 or 122. Each of the controllable output gratings 104 and 108 also includes a first segmented conductive layer 124 or 126 and a second conductive layer 130 or 132, such as may be formed by indium tin oxide (ITO), straddling each of the transformable grating structures 112 and 114 for forming electrical fields across the transformable grating structures 112 and 114 and thereby modifying a refractive index of the electro-active materials of the transformable grating structures 112 and 114 with respect to the mating grating structures 116 and 118.

The first segmented conductive layers 124 and 126 are formed between the inside or outside surfaces 106 or 110 of the mating diffraction structures 116 or 118, and the second conductive layers 130 and 132 are formed between the transformable grating structures 112 or 114 and the cover plates 120 or 122. However, the two conductive layers 124 and 130 or 126 and 132 can be reversed or positioned between other layers so long as the appropriate electric fields can be formed across the transformable grating structures 112 or 114. The transformable and mating grating structures 112 and 116 of the first controllable output grating 104 as well as the transformable and mating grating structures 114 and 118 of the second controllable output grating 108 can also be reversed. A controller (not shown) controls the fields generated between each of the different segments (shown being divided by vertical bars) of the first conductive layer 124 or 126 and the second conductive layer 130 or 132 for selective controlling corresponding sections of the transformable grating structures 112 or 114 between active and passive states and can also control the field strength for varying the refractive index of the individual sections of the transformable grating structures 112 or 114 as well as the timing and duration over which the individual sections are maintained within the active state.

The selective activation of any one or more sections of the first controllable output grating 104 can be used to control the position along the waveguide 82 (e.g., the segment of the transformable grating structure 112) at which the first portion 94 (e.g., first spectral portion) of the individual propagating beams can be ejected from the waveguide 82. The selective activation of any one or more sections of the second controllable output grating 108 controls the position along the waveguide (e.g., the segment of the transformable grating structure 114) at which the second portion 96 (e.g., second spectral portion) of the individual propagating beams can be ejected from the waveguide 82. The activation of the different sections of the two controllable output gratings 104 and 108 can be synchronized with the input of the different angular beams (e.g., the pivot position of the scanning mirror), to control the position, intensity, and spatial distribution at which each of the portions 94 or 96 of each of the different angular beams is ejected from the waveguide 82. The individual sections of each of the first and second controllable output gratings 104 and 108 can be controlled as described above in terms of timing, duration, and diffraction efficiency (e.g., by regulating field strength) for such purposes as reconstructing a pupil within the eyebox, as well as for enlarging and uniformizing the pupil and using more of the available light.

In addition, the different sections of the first and second controllable output gratings 104 and 108 can be synchronized with each other so that when a section of the second controllable output grating 108 is activated, a corresponding section of the first controllable output grating 104 is deactivated to transmit the diffracted light portion 96 through the first controllable output grating 104 toward the eyebox. That is, the sections of the first controllable output grating 104 through with diffracted light from the second controllable output grating 108 is intended to pass can be rendered transparent for transmitting the diffracted light through the first controllable output grating 104 without further diffraction.

Figure 5:
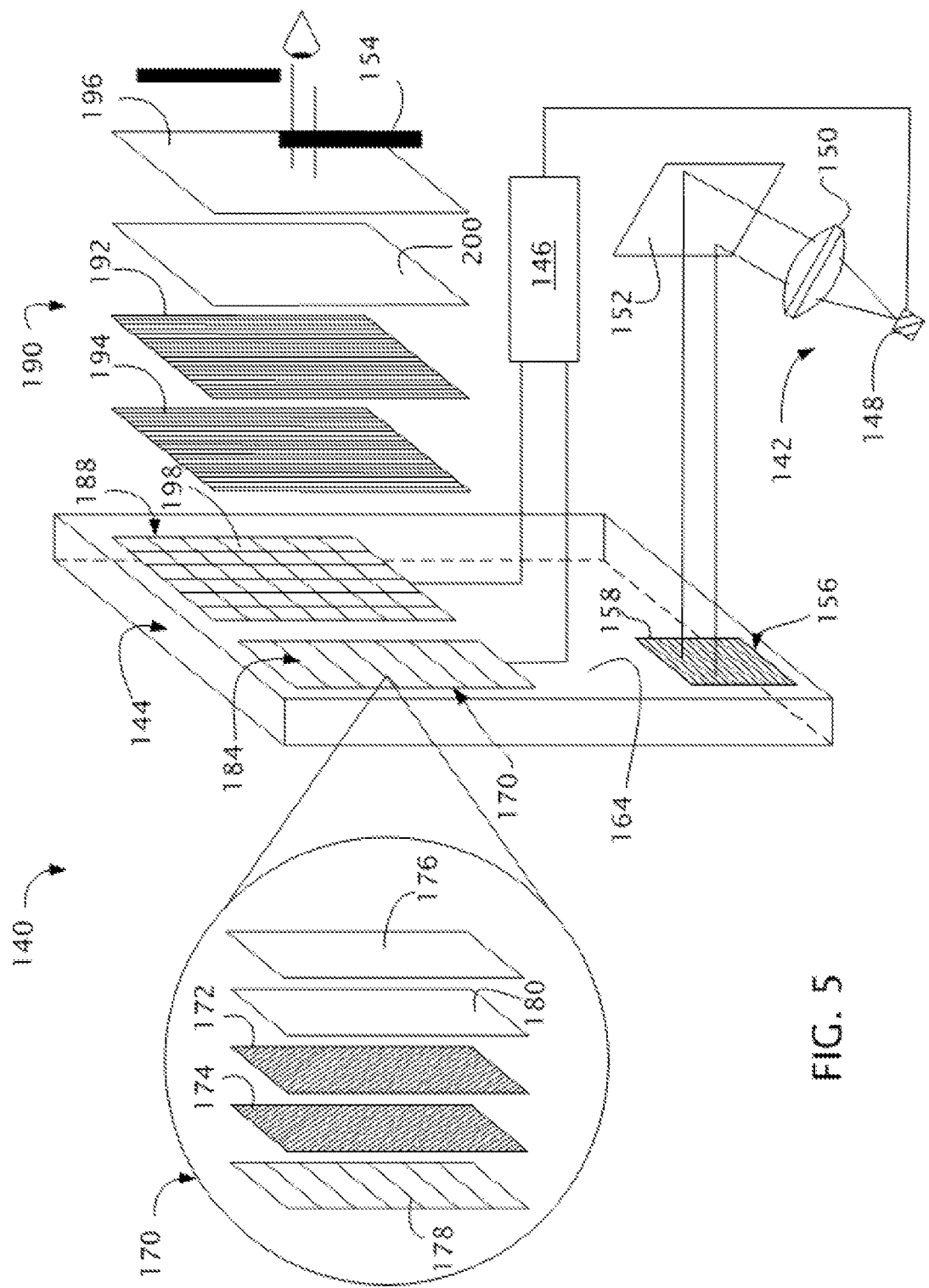
FIG. 5 is an exploded perspective view of an alternative near-eye display including a waveguide having a controllable segmented intermediate grating and a controllable segmented output grating within an output aperture of the waveguide.

A near eye display 140 depicted in FIG. 5 includes an image generator 142, a waveguide 144, and a controller 146. Similar to the image generators of the preceding embodiments, the image generator 142 produces a set of angularly related beams as the angular transform of an image, which is intended to be viewed as a virtual image within an eyebox 154. For example, the image generator 142 can include an addressable two-dimensional array 148 together with a collimating optic 150 (as shown), an addressable one-dimensional array together with a collimating optic and a one-dimensional steering mirror, or a light source, collimating optic, and a two-dimensional beam steerer. The one-dimensional or two-dimensional arrays function as light sources or at least modulate light from other sources. Each of the angularly related beams corresponding to an image pixel can be generated one at a time or in prescribed groups as determined or at least monitored by the controller 146. A fold mirror 152 reorients the set of angularly related beams in a direction toward the waveguide 144. Alternatively, the fold mirror 152 could itself be controlled in combination with an addressable linear array or collimated light source for generating one or both dimensions of the image.

The waveguide 144 can be formed and dimensioned similar to the waveguides of the preceding embodiments. Similarly, an input aperture 156 includes an input diffractive optic 158 for injecting the angularly related beams into the waveguide 144 for further propagation, preferably by total internal reflection.

Figure 6:
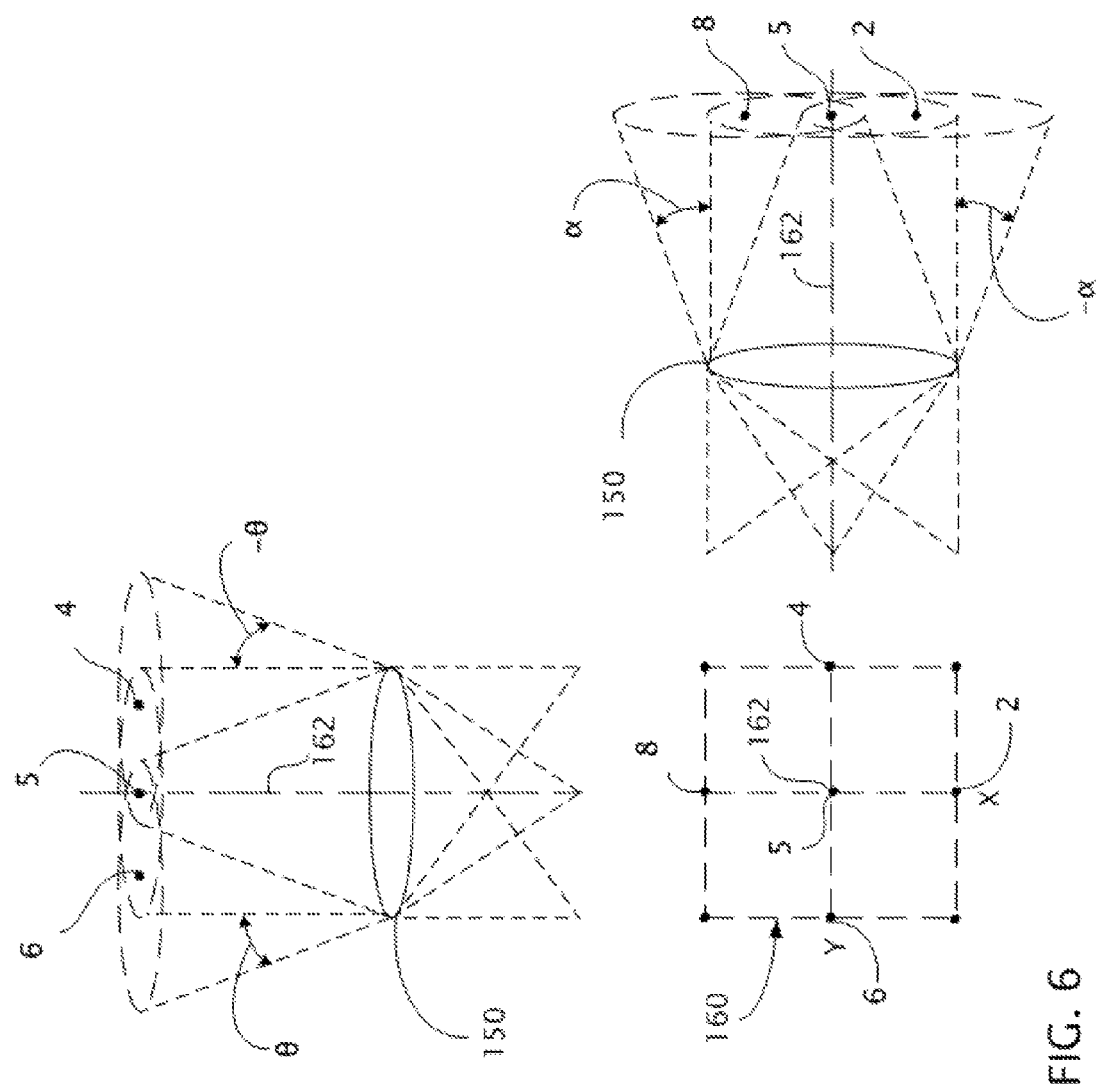
FIG. 6 is a view of an image plane along with two different orthogonal views of collimated beams originating from different positions within the image plane.
Figure 7:
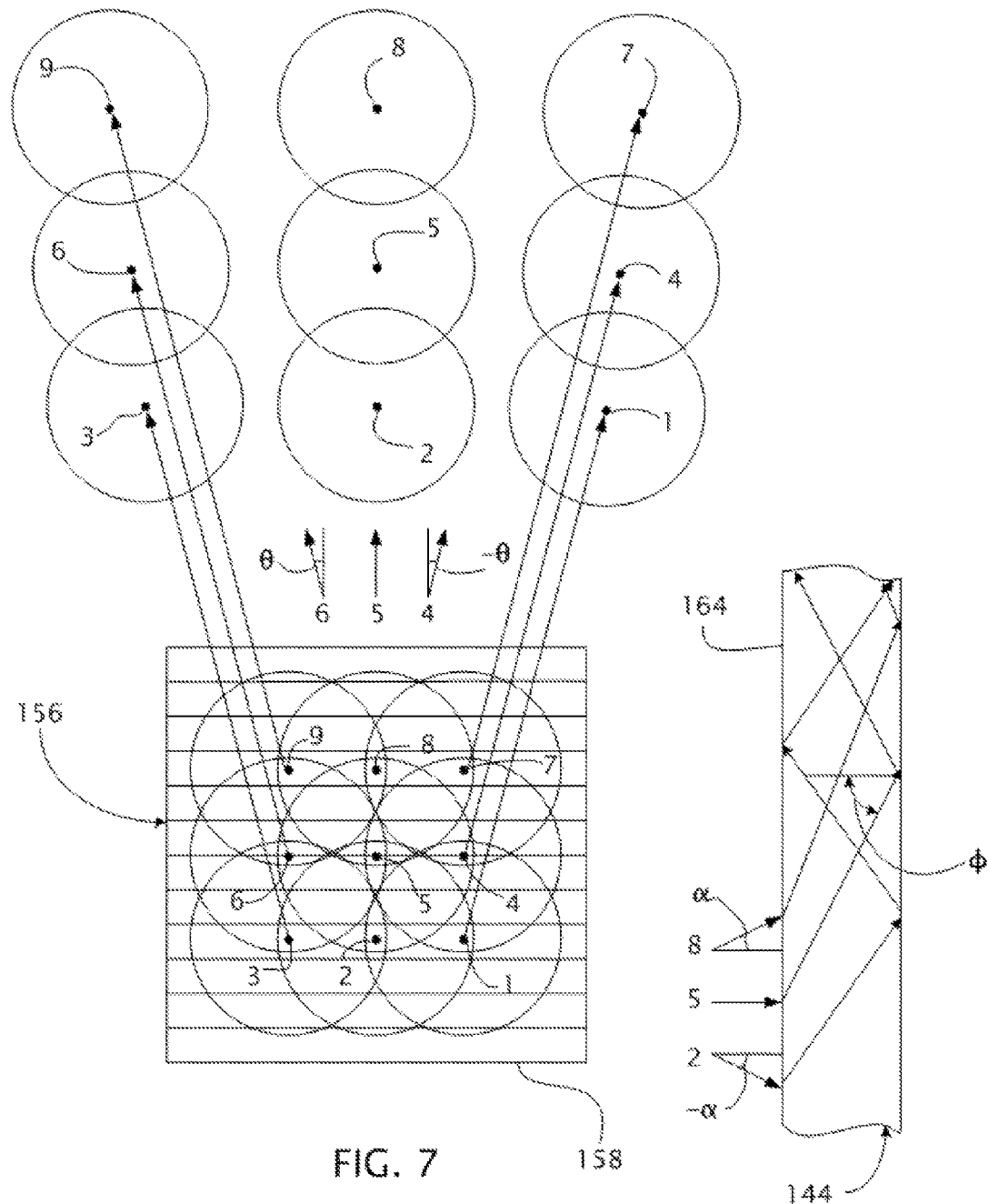
FIG. 7 is a schematic view of portion of the waveguide of FIG. 5 showing an arrangement of the beams at an input aperture and as initially propagated along the waveguide.

FIG. 6 provides a front view of an image 160 in and X-Y plane along with two orthogonal projections of angularly related beams formed by the collimating optic 150. The horizontal orthogonal projection shows three collimated beams 2, 5, and 8 that are relatively oriented through an angle $\alpha$, with beam 5 propagating along an optical axis 162 that extends normal to the image 160, with the beam 2 oriented at angle $-\alpha$ with respect to the axis 162, and with the beam 8 oriented at angle $+\alpha$ with respect to the axis 162. The angle $\alpha$ is shown true length in the horizontal projection. The vertical orthogonal projection shows three collimated beams 4, 5, and 6 that are relatively oriented through an angle $\theta$, with beam 5 (once again) propagating along the axis 162, with the beam 4 oriented at angle $-\theta$ with respect to the axis 162, and with the beam 6 oriented at angle $+\theta$ with respect to the axis 162. The angle $\theta$ is shown true length in the vertical projection. Each pixel within the image 160 defined within the X-Y plane has a unique angular transformation defined by different values for angles $\alpha$ and $\theta$ FIG. 7 is a schematic depiction of nine overlapping beams 1-9, which include the beams 2, 4, 5, 6, and 8 of FIG. 6, as incident upon the input diffractive optic 158 of input aperture 156 and as subsequently incident upon an inside surface 164 of the waveguide 144. Each of the beams 1-9 is depicted with a circular outline and limited size to show relative displacements among the beams 1-9. The input diffractive optic 158 diffracts the beams 1-9 into the waveguide 144, converting the angles $\alpha$ of each of the beams into corresponding incident angles $\phi$ (according to the laws of diffraction) within the waveguide 144. Although in the vertical direction of propagation each of the beams 1-9 tends to overlap itself at points of incidence on the inside surface 164 of the waveguide 144 (referred to as filling the waveguide), the points at which the beams 1-9 are incident upon the inside surface 164 tend to separate from one another in the vertical direction of propagation in accordance with their different angles of incidence. This phenomenon is depicted by the separation between the rows of beams 1-2-3, 4-5-6, and 7-8-9 within the waveguide 144. The different angles $\theta$ through which the columns of beams 1-4-7, 2-5-9, and 3-6-9 are incident upon the input diffractive optic 158 translates directly into different directions of propagation within the plane of the waveguide 144, which is depicted by the angular separation between the columns of beams 1-4-7, 2-5-9, and 3-6-9 and referred to as "walking."

Figure 8:
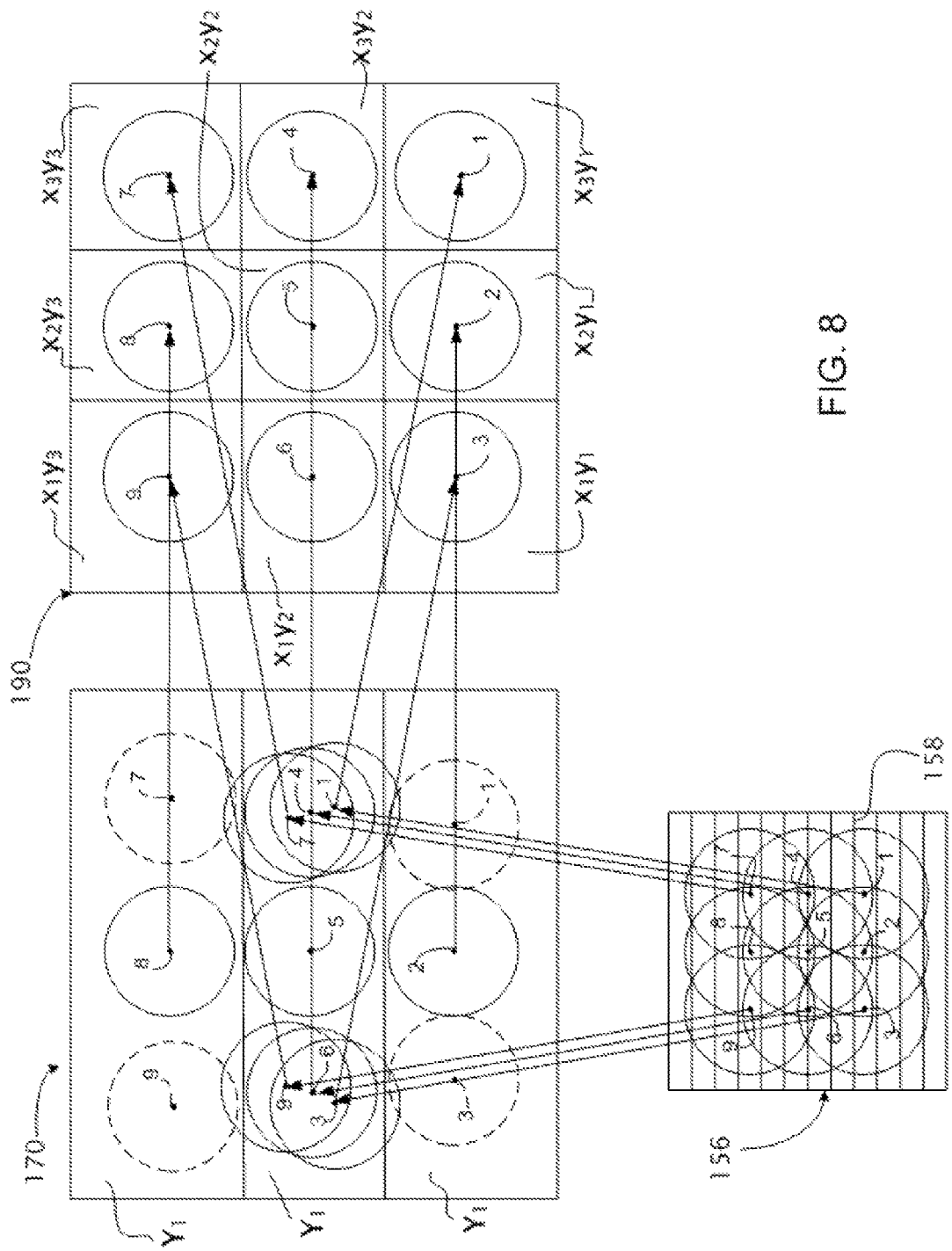
FIG. 8 is a schematic view similar to FIG. 7 showing the further propagation of the beams through both the controllable segmented intermediate grating and the controllable segmented output grating.

As shown in FIG. 8, and with further reference to FIG. 5, the vertically propagating and walking beams 1-9 encounter a controllable intermediate grating 170. Similar to the earlier described controllable gratings, the controllable intermediate grating 170 includes a transformable grating structure 172 together with a mating grating structure 174 such that in a passive state (i.e., deactivated state) of the transformable grating structure 172, the grating structures 172 and 174 preferably form an optically homogenous layer. The transformable grating structure 172 is preferably formed by an electro-active material, such as a liquid crystal material, that fills a space between the mating grating structure 174 and a cover plate 176. The controllable intermediate grating 170 also includes a first segmented conductive layer 178 and a second conductive layer 180, such as may be formed by indium tin oxide (ITO), straddling the transformable grating structure 172 for forming electrical fields across the transformable grating structure 172 and thereby modifying a refractive index of the electro-active materials of the transformable grating structures 172 with respect to the mating grating structure 174. In place of the controllable intermediate grating 170, other controllable intermediate structures could be used, such as optical routing devices based on refractive or reflective mechanisms, particularly when the structures are not required to support a view of the ambient environment through the affected portion of the waveguide 144. A permanent grating could also be used in combination with controllable refractive structures that control access to the grating by maintaining or frustrating internal reflections along corresponding portions of the waveguide 144.

The first segmented conductive layer 178 is formed between the inside surface 164 of the waveguide 144 and the mating diffraction structure 174, and the second conductive layer 180 is formed between the transformable grating structure 172 and the cover plate 176. However, the two conductive layers 178 and 180 can be reversed or positioned between other layers so long as the appropriate electric fields can be formed across the transformable grating structure 172. The transformable and mating grating structures 172 and 174 of the controllable intermediate grating 170 can also be reversed. The controller 146 controls the fields generated between each of the different segments (shown being divided by horizontal bars) of the first conductive layer 178 and the second conductive layer 180 for selective controlling corresponding sections 184 of the transformable grating structure 172 between active and passive states and can also control the field strength for varying the refractive index of the individual sections of the transformable grating structure 172 as well as the timing and duration over which the individual sections are maintained within the active state.

Although the first segmented conductive layer is divided into a stack of vertically differentiated sections 184, the transformable and mating grating structures 172 and 174 have grating rulings oriented at an acute angle to the vertical direction for reorienting the generally vertically propagating beams 1-9 in a generally horizontal direction. For example, the grating rulings can be oriented at 45 degrees for diffracting the vertically propagating beams 2, 5, and 8 (i.e., θ=0) in a horizontal direction. The remaining beams 1, 3, 4, 6, 7, and 9 can be diffracted in a generally horizontal direction, having regard for their initial inclination through a non-zero angle θ.

The selective activation of any one or more sections 184 of the controllable intermediate grating 170 via the controller 146 can be used to control the vertical position along the waveguide 144 at which the individual propagating beams are further diffracted in a horizontal direction along the waveguide 144. The activation of the different vertical sections 184 of the controllable intermediate grating 170 can be synchronized with the input of the different angular beams 1-9. As shown in FIG. 8, the number of vertical sections is reduced and individually labeled as sections Y1, Y2, and Y3 for purposes of simplifying the explanation of their control.

For example, for redirecting beam 8 in a horizontal direction, only section Y3 of the controllable intermediate grating 170 is activated to assure that beam 8 is not diffracted in the horizontal direction until reaching the vertical position of section Y3. The selective activation of section Y3 is timed with the injection of beam 8 into the waveguide 144. Sections Y1 and Y2 remain deactivated so that beam 8 continues to propagate in the vertical direction until reaching section Y3.

For redirecting beam 2 in a horizontal direction, section Y1 of the controllable intermediate grating 170 is activated in synchronism with the injection of beam 2 into the waveguide 144. Since the beam 2 is intended to be diffracted by the section Y1, the status of sections Y2 and Y3 can be controlled for other purposes, such as for dealing with any residual light that remains undiffracted. The remaining beams 1, 3, 4, 5, 6, 7, and 9 can be redirected in the horizontal direction by activating section Y2 of the controllable intermediate grating 170 in synchronism with the respective injections of the beams 1, 3, 4, 5, 6, 7, and 9 into the waveguide 144. Section Y1 remains deactivated to support the further propagation of the beams 1, 3, 4, 5, 6, 7, and 9 into section Y2. In practice, the controllable intermediate grating 170 can be divided into many more than just three sections and in different sizes and shapes to provide for more precisely and efficiently diffracting the individual beams 1, 3, 4, 5, 6, 7, and 9, together with any intervening beams associated with other image pixels, in the horizontal direction in synchronism with their respective injections into the waveguide 144.

A controllable output grating 190 formed on the inside surface 164 of the waveguide 144 receives the horizontally propagating beams 1-9 within a controllable output aperture 188. Again, similar to the earlier described controllable gratings, the controllable output grating 190 includes a transformable grating structure 192, a mating grating structure 194, and a cover plate 196, as well as a first segmented conductive layer 198 and a second conductive layer 200 straddling the transformable grating structure 192 for forming electrical fields across the transformable grating structure 192. The various layers of the controllable output grating 190 can be formed and controlled similar to the layers described for the controllable output gratings described earlier.

However, the transformable and mating grating structures 192 and 194 have grating rulings that are preferably oriented in a vertical direction traverse to the direction of propagation for ejecting the beams 1-9 from the waveguide 144. In addition, the first segmented conductive layer 198 is preferably formed in a two dimensional controllable array (shown as a checker pattern) for more precisely controlling the positions at which the individual beams 1-9 are ejected from the waveguide 144.

In FIG. 8, the controllable output grating 190 of the output aperture 188 is shown for purposes of simplicity divided into nine sections, labeled x1y1 through x3y3. The nine sections x1y1 through x3y3 are individually controlled in synchronism with the respective injections of the beams 1, 3, 4, 5, 6, 7, and 9 into the waveguide 144 for ejecting the beams 1, 3, 4, 5, 6, 7, and 9 from the waveguide 144 in relative positions corresponding to their points of injection into the waveguide 144 (see position of beams superimposed onto the input diffractive optic 158 of the input aperture 156) but spaced apart for constructing an exit pupil at a given eye relief position from the waveguide 144.

For example, section x2y2 is activated in synchronism with the injection of the beam 5 through the input aperture 156 for ejecting the beam 5 from the controllable output aperture 188 in a central position through corresponding angles α and θ both equal to zero. Section x1y2 is simultaneously deactivated so that beam 5 propagates without interruption to section x2y2. In addition, the remaining sections also preferably remain deactivated to preserve a view of the ambient environment through the waveguide 144 except where necessary to form the desired virtual image within the field of view of the eyebox 154.

Similarly, section x3y3 is activated in synchronism with the injection of the beam 7 through the input aperture 156 for ejecting the beam 7 from the controllable output aperture 188 in a laterally offset position through corresponding angle α equal to a given positive value and corresponding angle θ equal to a given negative value. Any intervening sections, such as sections x1y2, x1y3, x2y2 and x2y3 are preferably deactivated to assure the uninterrupted propagation of the beam 7 to the section x3y3, where the beam 7 is finally ejected from the waveguide 144. Any one or more of the remaining sections can be similarly deactivated to preserve the desired view of the ambient environment through the waveguide 144.

Figure 9:
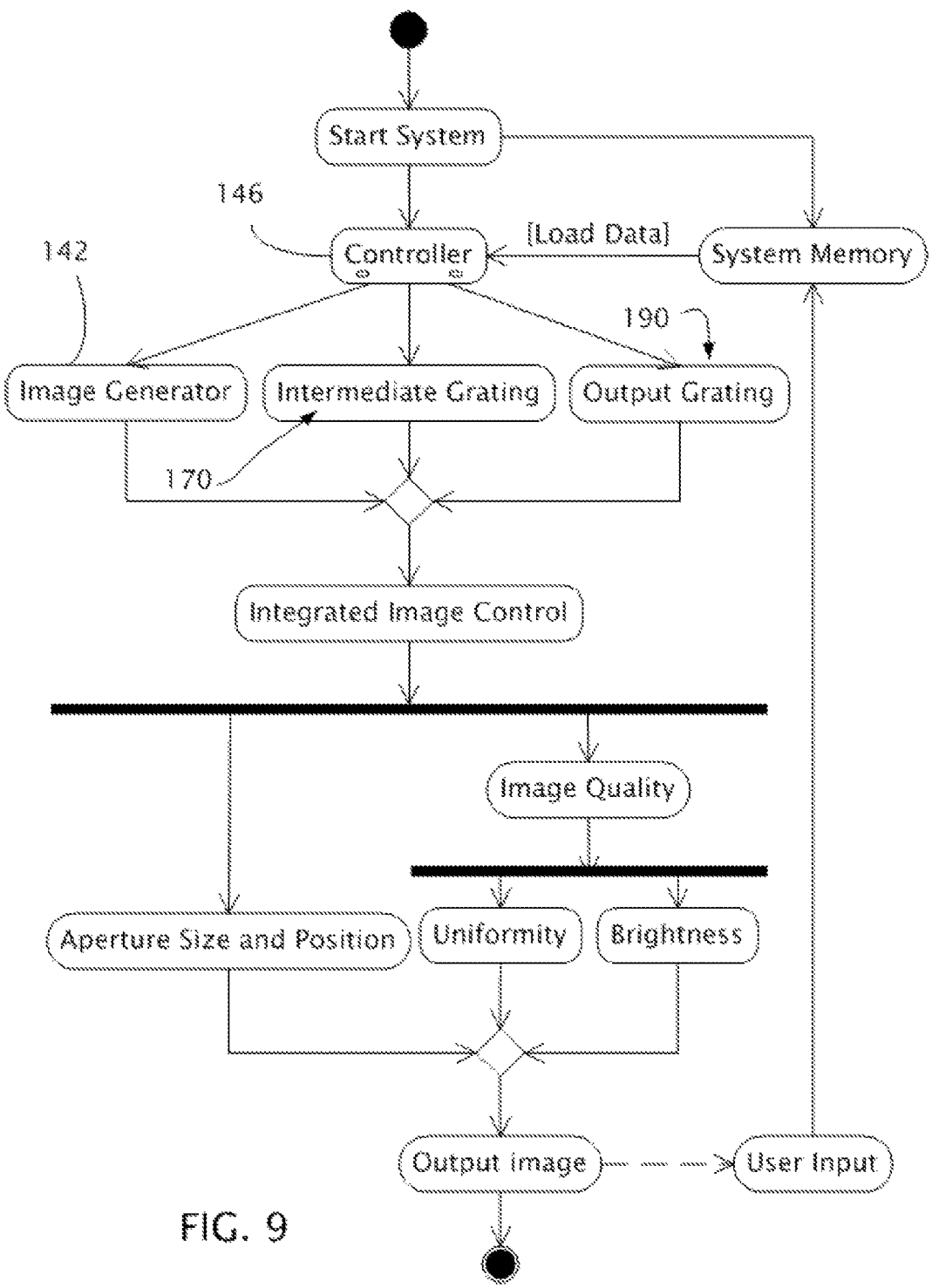
FIG. 9 is a dynamic image control diagram for operating the near eye display of FIG. 5.

Each of the remaining beams 1, 2, 3, 4, 6, 8, and 9 can be similarly ejected through a desired section x3y1, x2y1, x1y1, x3y2, x1y2, x2y3, and x1y3 of the controllable output aperture 188 in a relative position corresponding to its point of injection through corresponding angles α and θ for constructing a pupil within the eyebox 154 within which the generated virtual image is visible. The pupil size can be optimized by overlapping the each of the beams 1-9 within the eyebox 154. Uniformity can be further enhanced by relatively adjusting the efficiency, duration, or area over which each of the beams 1-9 is diffracted by the controllable intermediate grating 170 or the controllable output grating 190. The number, shapes, and relative arrangements of individually activatible sections x1y1 through x3y3 of the controllable output grating 190 can be varied to similarly control the propagation of other pixel conveying beams having intermediate or other values of angles α and θ. Additional (i.e., more finely distributed) controllable sections can be used for making intra-beam adjustments. Different clusters of the controllable sections can be simultaneously activated (albeit for different periods or at different efficiencies) to control both the spatial distribution of light within each beam and as well as the distribution of light between each beam as ejected from the waveguide 144. The controllable output grating 190 can also be controlled in coordination with the intermediate output grating 170 to adjust the lateral, vertical, or eye relief position of the eyebox 154, all by controlling the position at which each of the beams is ejected from the controllable output aperture 188. Both the size of the exit pupil and the area of the field of view within the eyebox 154 occupied by the pupil can be controlled by controlling both the size and the position of the beams ejected from the controllable output aperture 188. The deactivation of other sections of the controllable output aperture 188 preserves at least a partial view of the ambient environment over areas not occupied by the generated virtual image A dynamic aperture control diagram in association with the near-eye display 140 is presented in FIG. 9. A user is provided with access to system memory associated with the controller 145 through a graphical user interface or other interface to adjust parameters of the near eye display 140. For example, the user can input preferences for locating the size, lateral position, vertical position, and eye relief for the exit pupil, which forms a virtual aperture within which the user's eye pupil can be aligned for viewing the virtual image generated by the near-eye display 140. For binocular systems with multiple near-eye displays 140 within a common frame, the user can also specify an interpupillary distance between the exit pupils. In addition, the user can input preferences for brightness or contrast with respect to light passing through the waveguide from the ambient environment as well as preferences for image uniformity and the relative position of the virtual image within the field of view through the waveguide 144.

The controller 146 coordinates operations of the image generator 142, the controllable intermediate grating 170 and the controllable output grating 190, preferably on a pixel-by-pixel basis or in groups of pixels amenable to processing together, such as by individual regions of the image. In addition, angularly related beams propagating in different sectional columns of the controllable intermediate grating 170 and different sectional rows of the controllable output grating 190 can be simultaneously propagated and still individually controlled. For example, beams 1, 5, and 9 can be propagated together while still being independently ejected from sections x3y1, x2y2, and x1y3 of the controllable output grating 190.

The image generator 142, which is preferably controllable on a pixel-by-pixel basis, and the controllable intermediate and output gratings 170 and 190, which are controllable on a section-by-section basis, operate together to provide an integrated output aperture control over which the size, shape, position, distribution of light, and overall intensity of each angular beam can be controlled as well as being spatially overlaid and balanced in intensity with respect to each other within the eyebox 154. For making intra- or inter-beam adjustments in intensity, the diffraction efficiency or period of activation of the individual sections can be controlled. Any section not required for the instantaneous diffraction of light from the controllable output aperture 188 for contributing to the virtual image can be deactivated for maintaining the see-through capability of the waveguide 144 through the output aperture 144.

Although each embodiment is shown with a single waveguide, a stack of waveguides with similar input and controllable output apertures can also be used for separately propagating different portions of the image information including different wavelength bands. Color filters or other beam modifying optics can be placed between the stacked waveguides to provide additional functionality. Alternatively, more than one controllable grating can be stacked together for further controlling the passage of light through the controllable output aperture. For example, the cover glass of one controllable output grating could be used as base for a second controllable output grating. Control over the multiple controllable output gratings would be similar to the control over the controllable gratings 104, 108, 170, and 190 of FIGS. 4 and 5.

The controllable gratings have also generally been described as being activated for performing a diffractive function and being deactivated for performing a transmissive function. Alternatively, the controllable gratings could be activated for performing the transmissive function and deactivated for performing the diffractive function such as by using an electro-active material for the transformable grating structure that requires activation to match its refractive index with the refractive index of the mating grating structure.

Those of skill in the art will appreciate that these and other modifications and additions can be made within the overall teaching of this invention. The features and specifications described above for one embodiment can be readily applied to other embodiments described herein or readily understood in connection with the descriptions.

The invention claimed is:

1. A waveguide system for a near-eye display comprising
a transmissive waveguide for conveying image information in the form of a plurality of different angle beams for forming a virtual image,
an input aperture for receiving the plurality of different angle beams and for directing the plurality of different angle beams along the transmissive waveguide,
a controllable output aperture for ejecting the plurality of different angle beams from the waveguide toward an eyebox from which the virtual image can be viewed and for providing a view of an ambient environment from the eyebox through the controllable output aperture and the waveguide, and
the controllable output aperture including a transformable diffraction grating that is switchable between a first state for diffracting the plurality of different angle beams from the waveguide toward the eyebox from which the virtual image can be viewed and a second state for restoring the view of the ambient environment from the eyebox through the controllable output aperture and the waveguide.

2. The waveguide system of claim 1 in which the transformable diffraction grating functions as a diffraction grating in the first state and does not function as a diffraction grating in the second state.

3. The waveguide system of claim 2 in which the transformable diffraction grating functions as a transmissive plate in the second state.

4. The waveguide system of claim 1 in which the transformable diffraction grating includes a transformable grating structure formed by an electro-active material, a mating grating structure, and electrodes straddling the transformable grating structure for varying a refractive index of the electro-active material between the first and second states.

5. The waveguide system of claim 1 in which the controllable output aperture includes a plurality of aperture segments within which different sections of the transformable diffraction grating are independently switchable between the first and second states.

6. The waveguide system of claim 5 further comprising a controller for switching the different sections of the transformable diffraction grating between the first and second states in synchronism with the receipt of a succession of the different angle beams for ejecting the different angle beams toward the eyebox from different segments of the controllable output aperture for overlapping the different angle beams within the eyebox.

7. The waveguide system of claim 6 further comprising a controllable intermediate diffraction grating having different sections that are independently switchable between different states for adjusting relative positions between the different angle beams along a first dimension.

8. The waveguide system of claim 7 in which the controller switches the different sections of the transformable diffraction grating in synchronism with the different sections of the controllable intermediate diffraction grating for adjusting relative positions between the different angle beams in a second dimension so that the different angle beams converge toward overlapping positions within the eyebox in two dimensions.

9. A near-eye display comprising: an image generator for generating a succession of angularly related beams, a waveguide for propagating the succession of angularly related beams having an input aperture for receiving the succession of angularly related beams from the image generator and a controllable output aperture for ejecting the angularly related beams from the waveguide toward an eyebox, and the controllable output aperture having a plurality of independently controllable sections, and a controller that synchronizes the image generator with the controllable output aperture for ejecting different angularly related beams from different sections of the controllable output aperture for overlapping the angularly related beams within the eyebox.

10. The near-eye display of claim 9 in which each of the independently controllable sections the controllable output aperture is switchable between a first state for ejecting the one or more of the angularly related beams from the waveguide toward the eyebox and a second state for further propagating the one or more angularly related beams within the waveguide.

11. The near-eye display of claim 10 in which the independently controllable sections of the controllable output aperture are arranged in a two dimensional array and the controller directs the different angularly related beams through different independently controllable sections so that the different anglular beams converge toward overlapping positions within the eyebox in two dimensions.

12. The near-eye display of claim 9 in which the waveguide includes controllable intermediate structure having a plurality of sections that are independently controllable for adjusting relative positions between the different angularly related beams along a first dimension.

13. The near-eye display of claim 12 in which the different sections of the controllable output aperture are independently controllable for adjusting relative positions between the different angularly related beams along a second dimension.

14. The near eye display of claim 13 in which the controller controls the different sections of both the controllable intermediate structure and the controllable output aperture in synchronism with the image generator so that the different angular beams converge toward overlapping positions within the eyebox in two dimensions.

15. The near-eye display of claim 14 in which the plurality of sections of the controllable intermediate structure correspond to controllable sections of an intermediate transformable diffraction grating that are each switchable between different states for adjusting the relative positions between the different angularly related beams along the first dimension.

16. The near-eye display of claim 15 in which the plurality of sections of the controllable output aperture correspond to controllable sections of an output transformable diffraction grating that are each switchable between different states for adjusting the relative positions between the different angularly related beams along the second dimension.

* * * * *